(12) United States Patent
Crisp (10) Patent No.: US 7,209,772 B2
(45) Date of Patent: Apr. 24, 2007

(54) RADIO TELEPHONE

(75) Inventor: Martin Crisp, Bracknell (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/606,253

(22) Filed: Jun. 25, 2003

(65) Prior Publication Data

US 2004/0005908 A1    Jan. 8, 2004

Related U.S. Application Data

(63) Continuation of application No. 09/651,227, filed on Aug. 30, 2000, now Pat. No. 6,647,249, which is a continuation of application No. 08/804,388, filed on Feb. 21, 1997, now Pat. No. 6,151,485.

(30) Foreign Application Priority Data

Feb. 26, 1996  (GB)  ................................. 9604246.0
Apr. 25, 1996  (GB)  ................................. 9608469.4

(51) Int. Cl.
    *H04M 1/00*    (2006.01)
(52) U.S. Cl. .............. 455/575.4; 455/90.3; 379/433.12
(58) Field of Classification Search ............... 455/90.2, 455/90.3, 550.1, 575.1, 575.3, 575.4, 575.8, 455/348, 90.1; 379/433.01, 433.06, 433.11, 379/433.12, 434, 433.13; D14/137, 138
See application file for complete search history.

(56) References Cited

U.S. PATENT DOCUMENTS

| | | | |
|---|---|---|---|
| 4,272,655 A | 6/1981 | Mackenzie et al. | ......... 179/159 |
| 4,845,772 A | 7/1989 | Metroka et al. | ............... 379/61 |
| 5,151,946 A | 9/1992 | Martensson | ................... 379/38 |
| 5,369,788 A | 11/1994 | Nagai | ........................... 455/90 |
| 5,436,625 A | 7/1995 | Kubo | ........................... 341/22 |
| 5,493,690 A | 2/1996 | Shimazaki | .................... 379/63 |
| 5,564,078 A | 10/1996 | Nagai | ........................... 455/89 |
| 5,638,441 A | 6/1997 | Hattori et al. | ............... 379/433 |
| D381,020 S | 7/1997 | Harden et al. | ............. D14/138 |
| 5,668,867 A | 9/1997 | Nagai | ........................ 379/433 |
| 5,761,610 A | 6/1998 | Sorensen et al. | ............. 455/89 |
| 5,884,185 A | 3/1999 | Kim | ........................... 455/550 |
| 6,282,436 B1 * | 8/2001 | Crisp | ....................... 455/575.4 |

FOREIGN PATENT DOCUMENTS

| | | |
|---|---|---|
| DE | 3323858 | 3/1985 |
| DE | 3836406 | 5/1990 |
| DE | 3 836 406 | 9/1994 |
| DE | 4 307 164 | 9/1994 |
| EP | 0 414 365 | 7/1990 |
| EP | 0414365 | 2/1991 |

(Continued)

OTHER PUBLICATIONS

1. "User Configured Side Butons", by Schembri et al., 2 pages, Motorola Technical Developments, vol. 24, Mar. 1995.

*Primary Examiner*—Quochien B. Vuong
(74) *Attorney, Agent, or Firm*—Perman & Green, LLP (57) ABSTRACT

A radio telephone with a sliding cover that moves between positions concealing and revealing a plurality of keys. Predetermined functions are performed in response to respective sequences of actuations of the plurality of keys. The exposed keys are utilisable for a range of positions of the slide.

27 Claims, 6 Drawing Sheets

FOREIGN PATENT DOCUMENTS

| | | |
|---|---|---|
| EP | 0588210 | 3/1994 |
| EP | 0647037 | 4/1995 |
| EP | 0661823 | 7/1995 |
| FR | 2 698 747 | 11/1993 |
| FR | 2698747 | 6/1994 |
| GB | 2235850 | 8/1989 |
| GB | 2 235 850 | 3/1991 |
| GB | 2235606 | 3/1991 |
| GB | 2275587 | 8/1994 |
| GB | 2 308 938 A | 7/1997 |
| JP | 55109096 A | 8/1980 |
| JP | 2-044843 | 2/1990 |
| JP | 02044843 | 2/1990 |
| JP | 04335743 A | 11/1992 |
| JP | 6-252823 | 9/1994 |
| JP | 6252823 | 9/1994 |
| JP | 6-303296 | 10/1994 |
| JP | 6303296 | 10/1994 |
| JP | 07015498 A | 1/1995 |
| JP | 7-503119 | 3/1995 |
| JP | 07074806 A | 3/1995 |
| JP | 7-107001 | 4/1995 |
| JP | 7-203523 | 8/1995 |
| WO | WO 92/09163 | 11/1991 |
| WO | WO 92/09163 | 5/1992 |
| WO | 94/13088 | 6/1994 |
| WO | WO95/03642 | 2/1995 |

* cited by examiner

RADIO TELEPHONE

CROSS-REFERENCE TO RELATED APPLICATION(S)

This is a continuation from U.S. patent application Ser. No. 09/651,227, filed Aug. 30, 2000 now U.S. Pat. No. 6,647,249 which is a continuation from U.S. patent application Ser. No. 08/804,388, filed Feb. 21, 1997 now Patent No. 6,151,485.

BACKGROUND OF THE INVENTION

The invention relates to a telephone handset suitably a radio telephone handset.

There is a general drive in the field of mobile telephony to produce more compact telephone arrangements particularly for ease of transportation. There is, however, a conflicting, mainly psychological, requirement for a telephone to bridge the gap between the users ear and mouth to approximate the feel of using a radio handset to that of a traditional landline telephone.

One of the ways in which this has been achieved is by providing a hinged flap attached to the main body of the telephone that is pivoted to a position in which it overlaps the main body when stowed but extends the overall length of the phone when in use. One example of such a phone is found in U.S. Pat. No. 4,845,772.

Such phones do, however, tend to be relatively flimsy and prone to damage especially when the flap is open since it is then extremely prone to accidental knocks or other rough treatment. The hinged flap also presents the difficulty of implementing a reliable conductive path from the microphone to the main body of the telephone across the hinge.

Another arrangement that overcomes some of the disadvantages inherent with a hinged flap is described in EP 0 414 365. The compact telephone or handset described in this patent comprises a main body and a cover portion arranged for longitudinal sliding movement relative to the main body. In the retracted position the phone is compact and easy to store. In the extended position the phone is dimensioned such that it comfortably bridges the gap between the user's ear and mouth. The design can be made both compact and relatively robust.

In the handset described in EP 0 414 365 the connection enabling the call answer/send mode is only made when the cover portion is in its fully extended position. Hence the handset can only be used for making or answering a call when the cover is in its fully extended position.

SUMMARY OF THE INVENTION

In accordance with a first aspect of the present invention there is provided a radio handset comprising a housing having a key pad including a plurality of keys mounted on a main body and an extending portion mounted for longitudinal slidable movement between a first position in which the plurality of keys are concealed and a second position in which the plurality of keys are exposed, and a processor operable to perform respective predetermined functions responsive to respective sequences of actuations of the keys, the processor means being operable to perform the predetermined functions corresponding to the respective sequences of actuations of exposed ones of the keys for a range of positions of the extending portion.

A sequence for the purposes of this specification comprises a single actuation. In prior arts handsets of the type described in the introductory portion above the handsets are able to perform certain functions, such as making or receiving a call, only when the cover portion is in the fully open position. Making and receiving calls is impossible when the cover is in a position other than the fully open position. This means that the phone needs to be properly open before a call can be placed or received. If the sleeve portion does not 'lock' in the correct position, then the performance of the handset is impaired.

The present invention enables the processor to perform predetermined functions in response to respective sequences of exposed ones of the keys for a rang of positions of the extending portion. The problems associated with specific functionalities corresponding to specific positions of the extending portion are, therefore, ameliorated.

Preferably, at least one key in addition to the plurality of keys is exposed when the extending portion is in the first position. This key may be operable to control the volume of the output of the radio handset. If an incoming call is indicated, actuation of an exposed key preferably places the handset in the off-hook condition. This enables a call to be answered.

The processor means is preferably operable to perform the predetermined functions corresponding to sequences of actuations of the exposed ones of the keys for each position of the extending portion. By allowing exposed keys to be used to control operation of the microprocessor at each position of the extending portion, there is no difficulty in ensuring that the extending portion is properly positioned at a particular location before a particular function can be performed. Provided the relevent keys are exposed, a function can be performed. This ensures that operation of the handset is simplified. The extending portion can preferably occupy any position intermediate the first and second positions.

The main body preferably comprises a first transducer and the extending portion a second transducer, the first and second transducers being operational when the extending portion is in the first and second positions and positions intermediate the first and second positions. The first transducer is typically a speaker or ear piece and the second transducer a microphone, Movement of the extending portion from the first position preferably causes a call to be answered. Movement of the extending portion to the first position preferably causes a call to be terminated. This provides the user with options other than actuation of keys for answering and terminating calls.

In accordance with a second aspect of the present invention there is provided a radio handset comprising a housing having a key pad including a plurality of keys mounted on a main body and an extending portion mounted for longitudinal slideable movement between a first position in which the plurality of keys are concealed and a second position in which the plurality of keys are exposed, and processing means operable to place the handset in an off-hook condition with the extending portion in the first position, the second position and at least one intermediate position.

By enabling the handset to be placed in the off-hook condition in the first and second positions and at least one intermediate position, answering a call is not unduly restricted by the position of the extending portion. This again simplifies operation of the handset.

In accordance with a third aspect of the present invention there is provided a portable telephone comprising a set of keys; a cover portion movable between a first position covering the set of keys and a second position not covering the set of keys; and a further key not covered by the cover portion in either position, which has a first function when the cover is in the first position and a second function when the cover is in the second position.

BRIEF DESCRIPTION OF THE DRAWINGS

The invention will be described in more detail, by way of example, with reference to the accompanying drawings, in which.

DETAILED DESCRIPTION OF THE INVENTION

Figure 1:
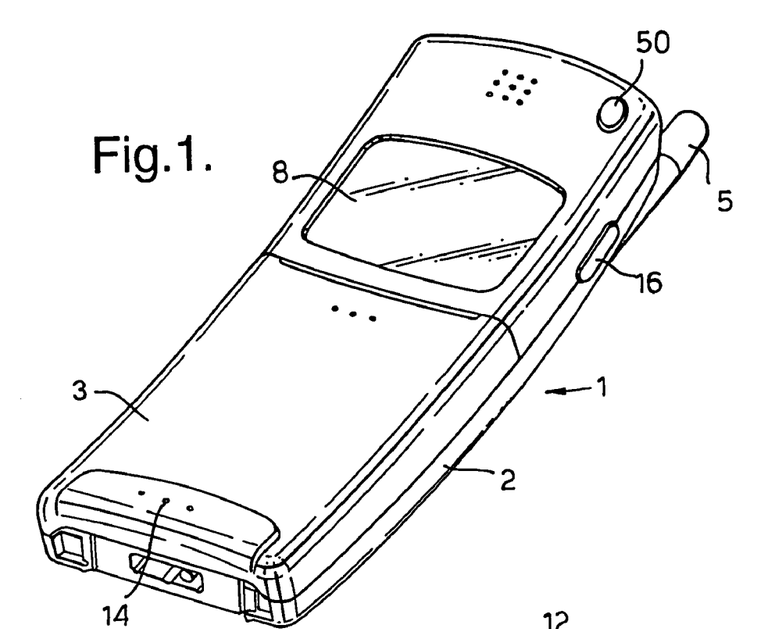
FIG. 1 is perspective view of a portable radio telephone handset in accordance with the present invention with the slide cover closed.
Figure 2:
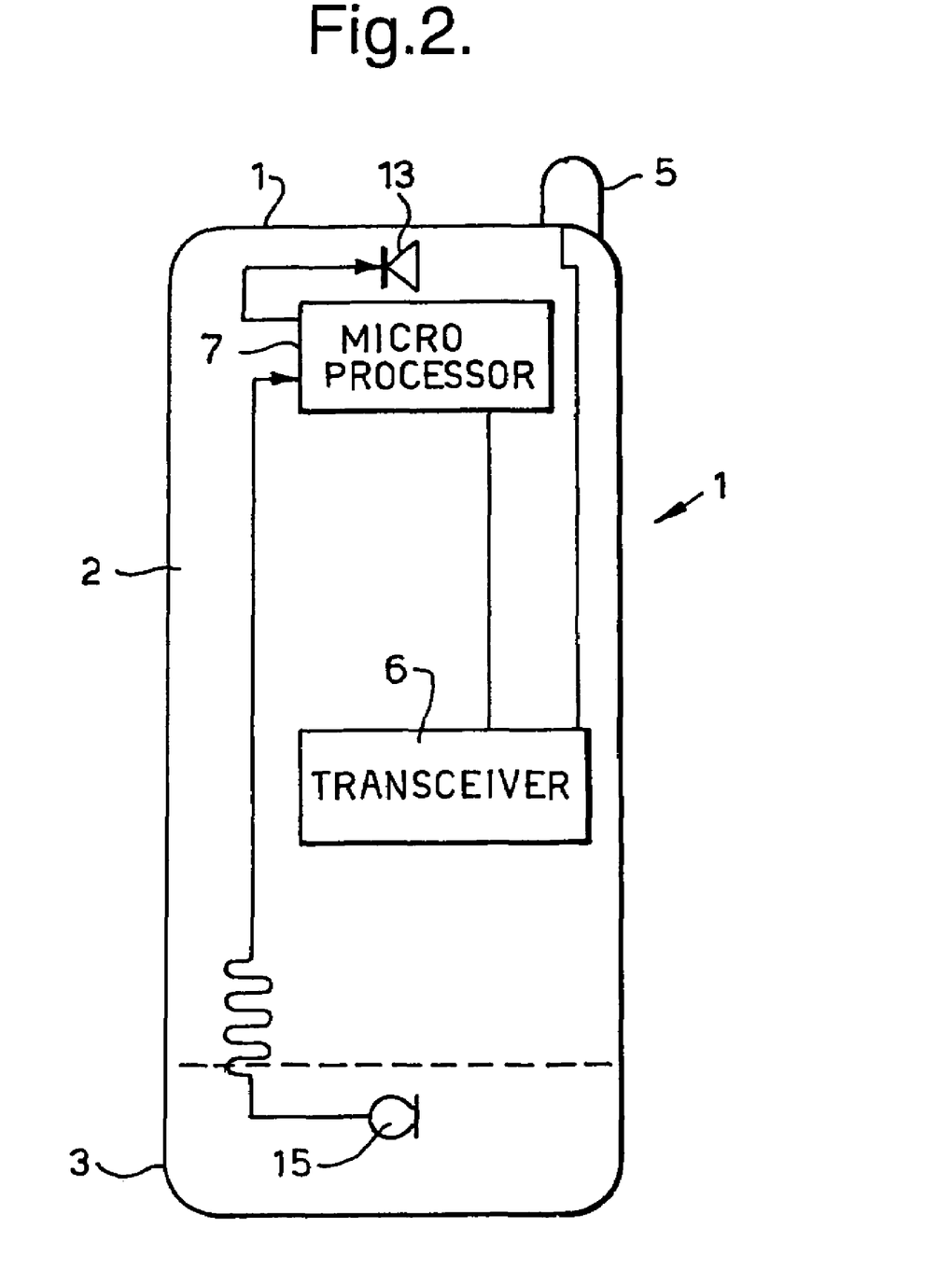
FIG. 2 is a schematic representation of a radio telephone handset.

A portable telephone handset in accordance with an embodiment of this invention shown in FIGS. 1 to 12 comprises a housing 1 having a main body 2 enclosing substantially the whole of the electronic circuitry of the radio telephone and a sleeve portion 3 slidably mounted on the main body 2. The handset has an antenna 5, a transceiver 6 and processing means 7 programmed with an algorithm which is operative to select a communication channel with a base station (FIG. 2). Information is displayed on a liquid crystal display (LCD) panel 8.

Included on the housing 1 is a set of keys. There is a first group 10 of keys or buttons labelled 0–9, * and # arranged in an array of three rows and four columns, as is usual and a second group 11 of control keys or buttons for selecting various predetermined actions such as memory storage and recall, last number redial, call start (e.g. labelled SEND) etc., again as is usual. The "key" could be a key or button or any element for providing input to the microprocessor, preferably input from a user and preferably by means of contact with and/or pressure on and/or touching of the key. The display panel, LCD 8 is located on the housing above the two groups of keys. Above the display is located a series of holes 12 behind which is an earphone or speaker 13 for transmitting speech or other sounds to the user of the radio handset. The sleeve has a series of holes 14 at its lower end behind which are mounted a microphone 15 (FIG. 2).

Figure 3:
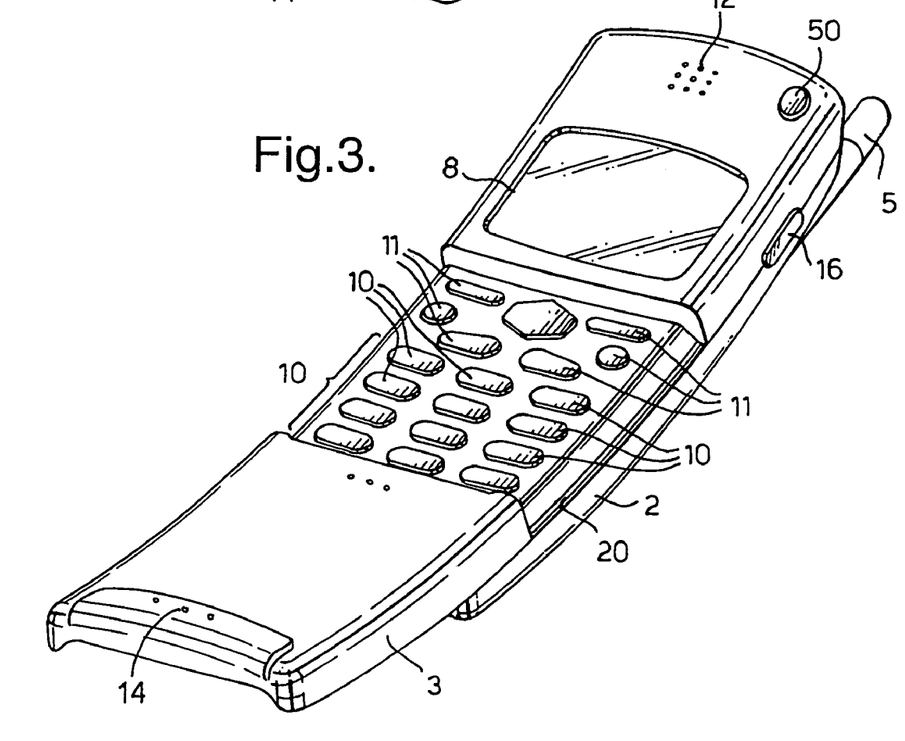
FIG. 3 is a perspective view of the portable radio telephone handset of FIG. 1 with the slide cover fully open.

The sleeve portion 3 is arranged to slide relative to the main body between a closed position illustrated in FIG. 1 and a fully open position illustrated in FIG. 3. The main body of the housing is curved and the sleeve-like portion provides a curvature sufficient for the ear 13 and mouth 15 pieces to be positioned respectively adjacent the ear and mouth of the user. The material chosen for the slide of this particular embodiment of the invention is a polycarbonate with added teflon to provide a satisfying sliding feel when in use.

Figure 4:
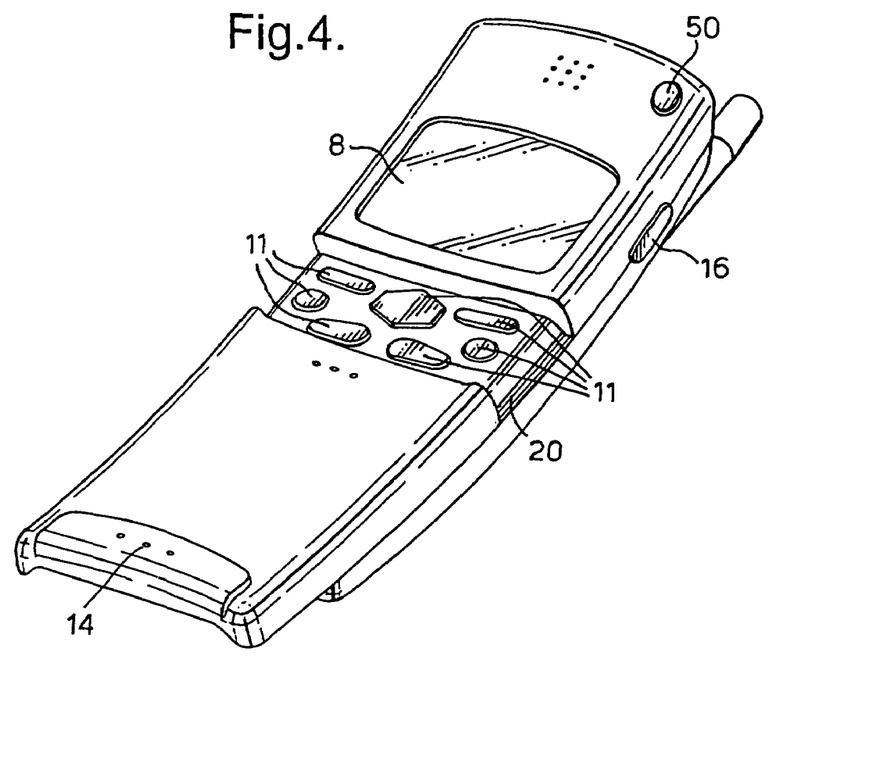
FIG. 4 is a perspective view of the portable radio telephone handset of FIG. 1 with the slide cover in an intermediate position.

In the closed position, both groups of keys 10,11 are concealed (FIG. 1); the only key available for use being a multi-purpose key 16 positioned on the side of the handset. In the fully open position (FIG. 3) both groups of keys 10,11 are revealed allowing both numerical and control keys to be selected. A third sleeve position is illustrated in FIG. 4 in which the sleeve is partially open showing only the second group of keys 11. In this position the control keys can still be selected but the numeric keys cannot as they are concealed. Calls can be made using the control keys, i.e. calls from memory, and calls can be taken. In this embodiment it is the physical concealment of the keys, with the wall of the sleeve portion interposed between the keys and the user, that prevents them from being used. In other embodiments (not illustrated) It could merely be the interposition of a barrier which does not conceal the keys but covers them at least enough to prevent fingers reaching them that prevents the keys from being used. For example, the barrier could have small holes in it.

The intermediate position of FIG. 4 further allows single handed operation of the phone. The sleeve can ideally be slid to the intermediate position under the force of the user's thumb. The control keys can then be manipulated to make a call or set the mode of operation of the handset.

Although the microprocessor 7 is functional at all times, when the numerical keys 10 of the first group are concealed they cannot physically be actuated to make a telephone call. When the sleeve is fully closed, the only key that can be actuated is the multipurpose key 16, which forms a third key group, positioned on the side of the phone and revealed for all positions of the sleeve 3. The handset is programmed to respond to actuation of the multi-purpose key 16 in dependence on the position of the sleeve relative to the main body. When the sleeve is closed actuation of the multi-purpose key 16 answers incoming calls (by putting the handset "off hook") and optionally the function of the key may include adjusting the volume of the phone when there is no incoming call. When the sleeve is open, so that other keys are exposed (particularly answer key 11a) the multipurpose key 16 cannot (except in "any key answer" mode) be used to answer incoming calls; It only acts as a volume key. The handset may be programmed so that when the slide is closed the use of the multipurpose key 16 for volume adjustment adjusts the ringing volume of the phone and when the slide is open the key adjusts the speaker volume of the phone. The function of the multi-purpose key depends on the position of the slide.

The sleeve portion 3 is attached to the main body 2 for sliding movement relative thereto. A groove 20 is provided on each side of the main body (FIGS. 3,4,5) running substantially along its length. Runners 21 positioned, one on each side of the underside of the sleeve portion (FIG. 9), are held in the grooves to allow the sleeve portion 3 to slide relative to the main body 1 whilst being captured thereby.

In the embodiment described, the arrangement of the groups of keys is such that in particular positions the sleeve provides access to the respective groups. It is desirable, therefore, that there is a preference for the sleeve to be located in positions revealing either neither the first nor the second set of keys (closed) (FIG. 1), the second set of keys alone (intermediate), (FIG. 4) or both the first and second sets of keys (fully extended) (FIG. 3). The third set of keys i.e. (in this embodiment) the multipurpose key 16 is revealed at all times.

In order to hold the sleeve in the three preferential positions the main body of the handset is provided with a pair of members 22 (FIGS. 5,10) located within the main body that protrude one into each of the grooves 20 located on the main body 2 of the handset. The members 22 are spring loaded to allow the sleeve portion to move from the preferred positions when desired. The member 22 is resilient and mounted in a holder 24 inside the main body 2 with a detent 23 that protrudes through an aperture 25 in the groove 20. The detent 23 is depressed so that it no longer protrudes into the grooves 20 by one of the runners 21 of the sleeve portion 3. The runners are provided with recesses 26 (FIG. 9), when a recess 26 coincides with a detent 23, the sleeve 3 is held in position. The recesses 26 are provided so that the sleeve portion is 'caught' in the closed, intermediate and the fully open positions.

Two of the recesses 26 in the runners 21, those corresponding to the closed and Intermediate positions have cammed edges so that when extra force is provided to slide the sleeve from the first two sleeve positions, the detent 23 is depressed below the surface of the bottom of the groove 20 for disengagement from the recess 16 allowing the sleeve portion 3 to continue to slide in the chosen direction. The recess corresponding to the intermediate position will have cammed leading and trailing edges to allow movement in either direction. The recess corresponding to the closed position may only have a cammed leading edge to allow for ease in opening.

When the sleeve is in the fully extended position it is not desirable for the sleeve to continue to open as this could result in the sleeve portion being removed from the main body of the handset. To avoid this, the third recess 26 is deeper and the abutment surface in the direction of a complete withdrawal of the sleeve portion is not cammed. This provides a more absolute stop against further extension of the sleeve portion. As a secondary measure, an in-mould plastic pin 27 (FIG. 9) is provided on each side of the sleeve portion 3 of the handset. Each of these abuts complementary surfaces located on the main body 2 of the handset to substantially prevent withdrawal of the sleeve portion 3.

Figure 9:
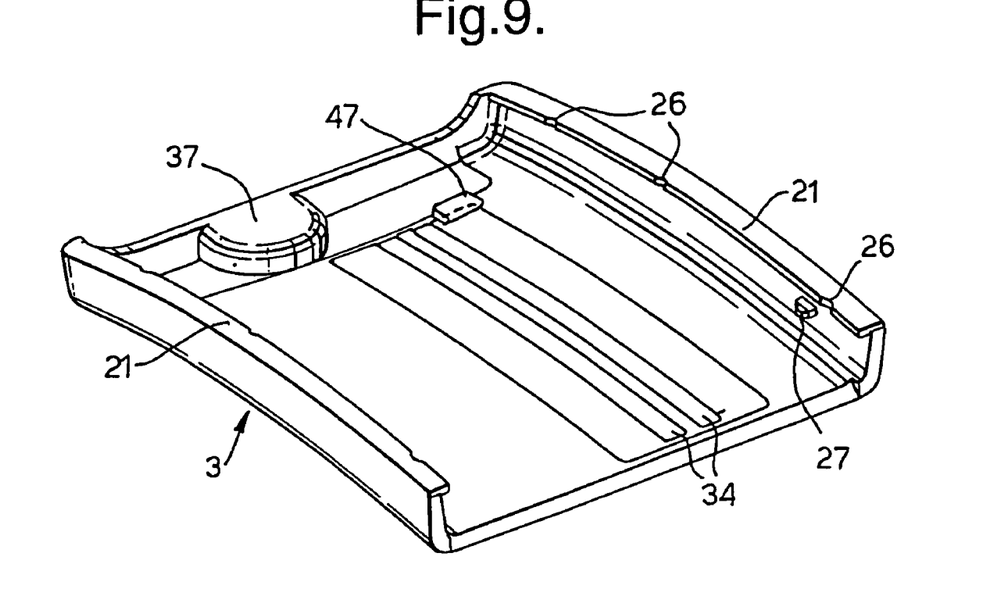
FIG. 9 is a partial perspective underside view of the slide cover of the portable radio telephone handset of FIG. 1.
Figure 10:
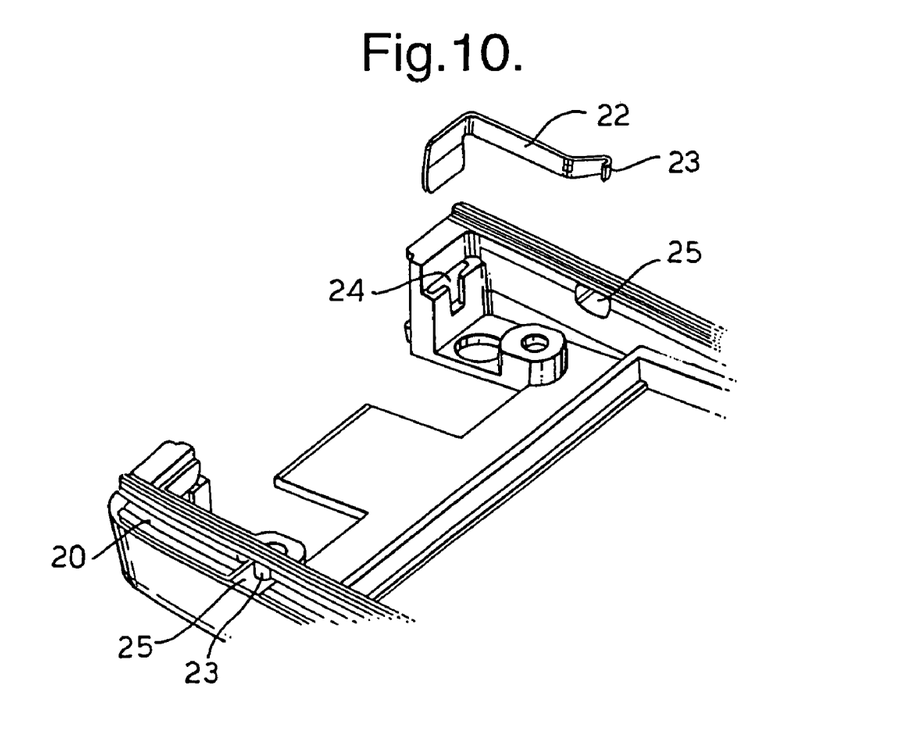
FIG. 10 is a partial perspective view of the main body of the portable radio telephone handset showing the grooves for engagement with the sliding portion.
Figure 11:
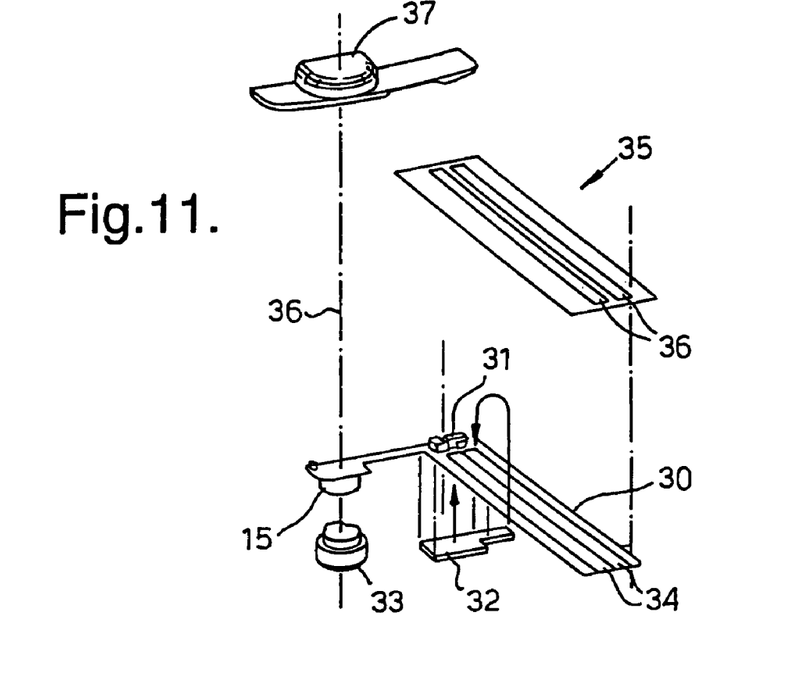
FIG. 11 is an exploded view of the microphone housing of FIG. 9.
Figure 12:
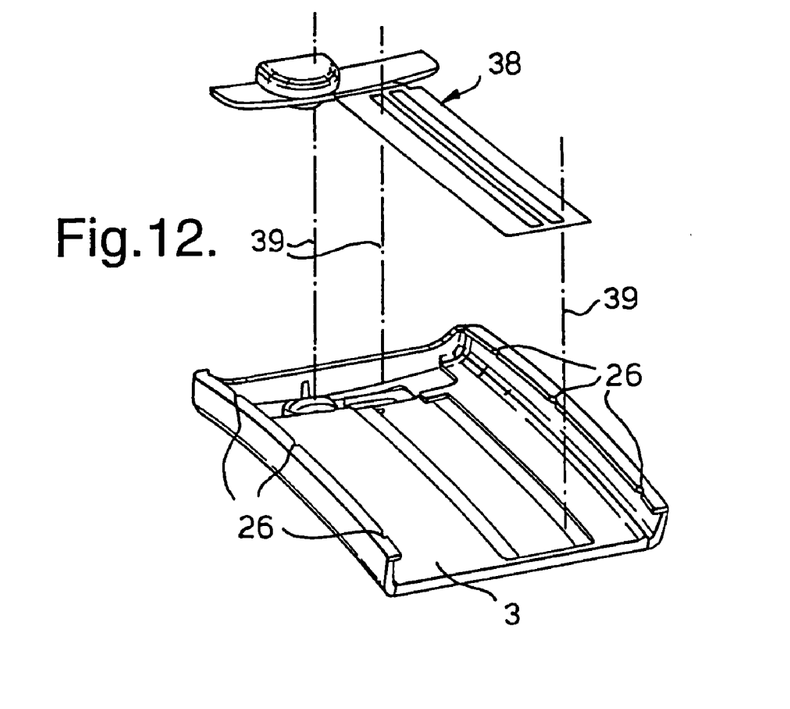
FIG. 12 is an exploded view of the sleeve and microphone housing of FIG. 9.

As can be seen from FIGS. 9, 11 and 12, the microphone 15 is mounted on a small flexible PCB 30 along with a filter 31 and a foam plastics member 32 that acts, together with microphone holder 33, as an acoustic dampener to improve the acoustic properties of the microphone 15. The flexible PCB 30 also includes' two conducting tracks 34 for maintaining contact between the microphone 15 and the electronics of the handset located within the housing of the main body.

The flexible PCB 30 is mounted to the underside of the bare plastic sleeve itself suitably by laminating a polycarbonate foil 35 with apertures 36 coinciding with tracks 34 to it and then welding that part to the underside of the sleeve portion to the slide cover by ultrasonic welding. A microphone housing 37 surrounding the microphone 15 in the microphone holder 33 is then fitted. The resulting assembly 38 is attached to the underside of the sleeve 3 with the aid of guide pins indicated by dotted lines 39.

Figure 5:
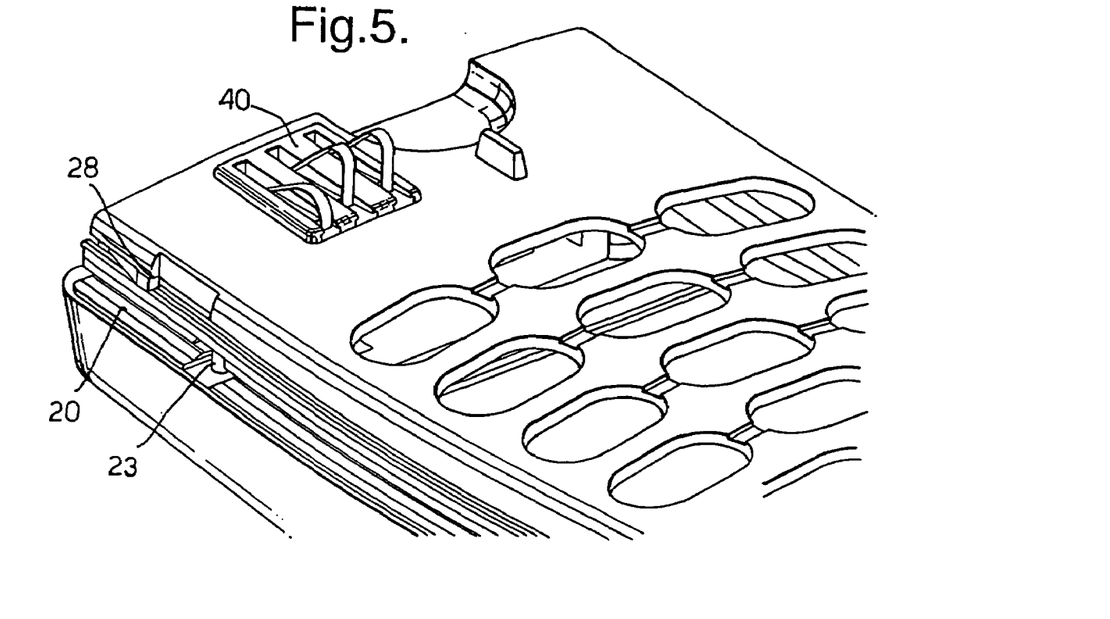
FIG. 5 is partial perspective view of the main body of the portable radio telephone handset of FIG. 1 with the slide cover removed showing the microphone connector.
Figure 6:
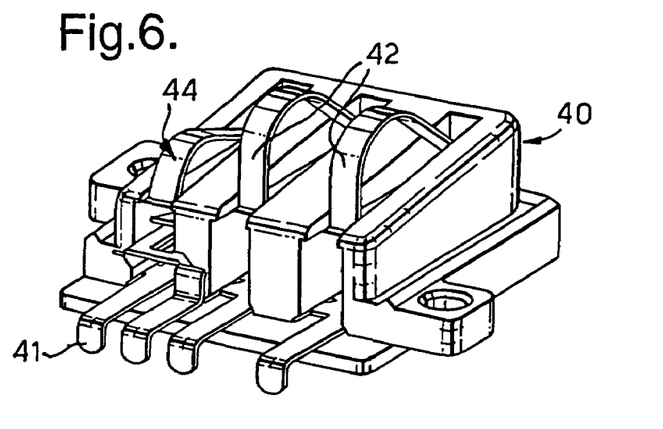
FIG. 6 is a perspective view of the microphone connector of FIG. 4.
Figure 7:
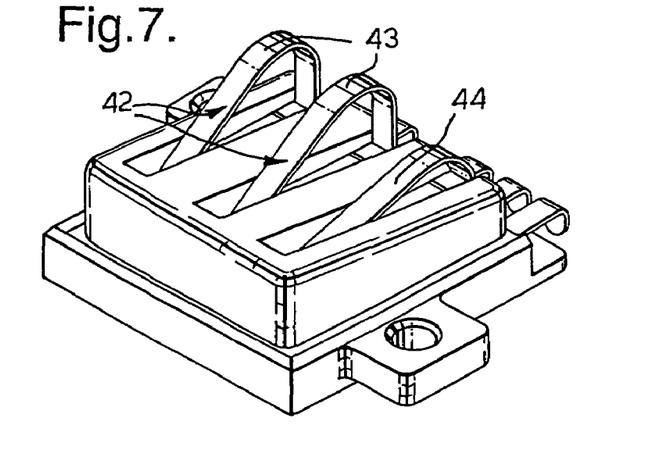
FIG. 7 is a perspective view of the microphone connector of FIG. 4 from the other end.
Figure 8:
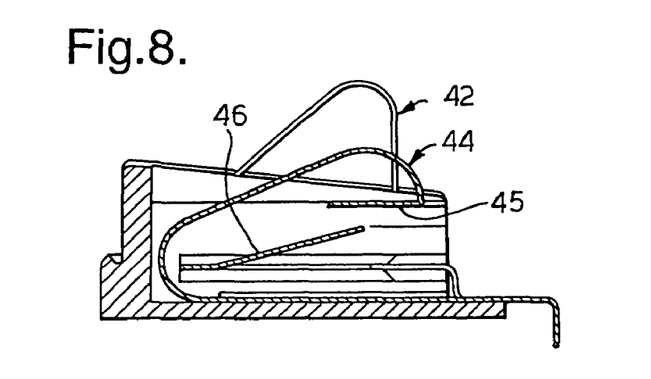
FIG. 8 is a section through the microphone connector of FIG. 4.

When in position the two conducting slide tracks 34 extend substantially from one end of the sleeve portion to the other to allow the microphone 15 to maintain electrical contact with the electronics of the handset for all positions of the sleeve between and including the open and closed positions. The microphone housing 37 can also suitably be ultrasonically welded to the underside of the sleeve and encloses the microphone and Its components to additionally protect from dirt or other damage. When in position, the microphone 15 is located behind the holes 14 at the bottom end of the slid connected to the two slide tracks A microphone connector 40 is mounted on the main body of the handset suitably by ultrasonic welding (FIG. 5). The connector is positioned so that it is in electrical contact with the main PCB in the body of the handset by contacts 41 or other mechanism. It is positioned to make contact with the two slide tracks at all positions of the sleeve for provide an electrical connection between the microphone and the main processor of the handsets. As the microphone is in electrical contact with the main processor via the slide tracks at all times the signals from the microphone can be utilised in the main processor when appropriate for incoming or outgoing calls. The connection is also maintained during movement of the sleeve portion. The handset can, therefore, be used to the extent that the relevant keys are exposed in all positions of the sleeve relative to the main body. The microphone connector can be seen in greater detail in FIGS. 6 to 8.

The microphone connector 40 comprises two spring contacts 42 disposed for contact with respective ones of the two slide tracks. The bearing surfaces 43 of the spring clip are flattened to provide for improved contact with the slide tracks. The spring loading of the contacts ensures good electrical contact between the microphone and microprocessor for a range of distances between the sleeve portion and main body at the microphone connector element. This provides for a good degree of tolerance for the manufacturing process. It also allows the sleeve to be at different distances from the microphone connector for respective positions of the slide.

For reliability is it desirable that the electrical connection between the microphone connector and the slide tracks is hard wearing and resistant to dirt or other damage. In this particular embodiment the connectors are plated with 20 microns of palladium nickel followed by 2 microns of hard gold. The slide tracks 34 can also be plated with hard gold, in this embodiment 5 microns, for improved life.

The microphone connector also has a built-in microswitch 44 which is activated by a protrusion located in the underside of the sleeve portion. The microswitch 44 provides a signal indicating that the sleeve portion 3 is not in the closed position. This signal is used to allow movement of the slide from the closed position to be detectable. This enables movement of the slide 3 to be utilised to answer an incoming call.

The microswitch 44 has a spring loaded member 45 protruding from the main body towards the sleeve cover 3 and a contact arm 46 in alignment with the spring loaded member such that when the spring loaded member is depressed by a sufficient degree contact is made with the contact arm. On such contact a signal is sent to the microprocessor. A protrusion 47 on the underside of the sleeve 3 in a position corresponding to the microswitch when the sleeve is in the closed position is provided on the underside of the sleeve portion. The protrusion 47 has a cammed surface that progressively presses the spring loaded element into contact with the contact arm as the sleeve portion slides towards the closed position. The switch 44 is closed when the sleeve is in the closed position and signals from the switch can, accordingly, be used as an indication as to whether or not the sleeve is closed position.

By providing an input from the microswitch to the microprocessor the position of the sleeve portion can be used as an additional indication to the microprocessor. A call can be answered when the sleeve is moved from the closed position, and/or a call terminated when the sleeve is closed. And this data can be used to determine the function of the multi-function key 16.

Two of the operating modes of the handset are 'any key answer' modes. If the handset is in the first 'any-key answer' mode and an incoming call is indicated d, the handset can be put in the off-hook condition for receiving the call by pressing any of the exposed keys other than the power key 30, including the multi-function key. When the sleeve portion of the handset is fully open any one of the available keys can be used to answer a call. In the second 'any-key answer' mode the multi-purpose key does not answer a call if the slide is open.

When in either 'any key answer' mode, or in the telephones normal answer mode, if the sleeve is closed there are two exposed keys, the multi-purpose key 16 and the power control key 50. The handset can be closed and powered up or closed and powered down. If the handset is powered up it is in standby, i.e. in condition to receive calls. If the handset then receives a paging message indicating that there is an incoming call for the handset, the call can be answered in two ways, either by actuating the volume control key or by sliding the sleeve from the closed position. The microprocessor uses the signal from the microswitch to determine that the sleeve is in the closed position. Any signal received from the multi-purpose key when the sleeve is closed can accordingly be utilised to receive an incoming call. Likewise, with th microswitch indicating that the sleeve is closed, moving the sleeve from the closed position causes the microswitch to indicate this displacement to the microprocessor 7. This signal can also then be used to place the handset in the off-hook condition for receiving an incoming call.

A call can be terminated by pressing the end key, provided it is exposed or closing the sleeve. The microphone and earpiece are connected to the microprocessor for all positions of the slide and the keys are continually polled to determine if they have been actuated.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A portable telephone comprising:
a first body portion comprising first and second grooves, a keypad, and a second body portion comprising first and second runners, the first and second runners being positioned in the first and second grooves respectively to allow the second body portion to slide longitudinally relative to the first body portion between a closed position in which the keypad is concealed and an open position in which the keypad is exposed, the first body portion further comprising a first detent located in the first groove, and the second body portion further comprising a first recess in the first runner to hold the second body portion relative to the first body portion when the first recess coincides with the first detent; wherein the first recess is positioned in the first runner to coincide with the first detent when the second body portion is in the closed position; and wherein the first recess is positioned in the first runner to coincide with the first detent when the second body portion is in the open position.

2. The portable telephone as claimed in claim 1, wherein the first recess is positioned in the first runner to coincide with the first detent when the second body portion is in a position intermediate the open and closed positions.

3. The portable telephone as claimed in claim 1, wherein the second body portion further comprises a second recess in the first runner to hold the second body portion relative to the first body portion when the second recess coincides with the first detent.

4. The portable telephone as claimed in claim 3, wherein the second recess is positioned in the first runner to coincide with the first detent when the second body portion is in the open position.

5. The portable telephone as claimed in claim 3, wherein the second body portion further comprises a third recess in the first runner to hold the second body portion relative to the first body portion when the third recess coincides with the first detent.

6. The portable telephone as claimed in claim 5, wherein the third recess is positioned in the first runner to coincide with the first detent when the second body portion is in a position intermediate the open and closed positions.

7. The portable telephone as claimed in claim 6, wherein the first body portion further comprises a second detent located in the second groove, and the second body portion further comprises a fourth recess in the second runner to hold the second body portion relative to the first body portion when the fourth recess coincides with the second detent.

8. The portable telephone as claimed is claim 7, wherein the fourth recess is positioned in the second runner to coincide with the second detent when the second body portion is in the closed position.

9. The portable telephone as claimed in claim 7, wherein the fourth recess is positioned in the second runner to coincide with the second detent when the second body portion is in the open position.

10. The portable telephone as claimed in claim 9, wherein the first and second detents are spring loaded.

11. The portable telephone as claimed in claim 9, wherein the first and second detents extend through first and second apertures in the first and second grooves.

12. The portable telephone as claimed in claim 9, wherein the recesses have cammed edges.

13. A portable telephone comprising:
a first body portion comprising first and second grooves, the first body portion further comprising a first detent located in the first groove and the second groove having a second detent;
a keypad; and
a second body portion comprising first and second runners, the first and second runners being positioned in the first and second grooves respectively to allow the second body portion to slide longitudinally relative to the first body portion between a closed position in which the keypad is concealed and an open position in which the keypad is exposed;
the second body portion further comprising:

a first recess in the first runner to hold the second body portion relative to the first body portion when the first recess coincides with the first detent, the first recess being positioned in the first runner to coincide with the first detent when the second body portion is in the closed position;

a second recess in the first runner to hold the second body portion relative to the first body portion when the second recess coincides with the first detent;

a third recess in the first runner to hold the second body portion relative to the first body portion when the third recess coincides with the first detent, the third recess positioned in the first runner to coincide with the first detent when the second body portion is in a position intermediate to the open and closed positions;

a fourth recess in the second runner to hold the second body portion relative to the first body portion when the fourth recess coincides with the second detent.

14. The portable telephone as claimed is claim 13, wherein the fourth recess is positioned in the second runner to coincide with the second detent when the second body portion is in the closed position.

15. The portable telephone as claimed in claim 13, wherein the fourth recess is positioned in the second runner to coincide with the second detent when the second body portion is in the open position.

16. The portable telephone as claimed in claim 15, wherein the first and second detents are spring loaded.

17. The portable telephone as claimed in claim 15, wherein the first and second detents extend through first and second apertures in the first and second grooves.

18. The portable telephone as claimed in claim 15, wherein the recesses have cammed edges.

19. A portable telephone comprising:
a first body portion comprising first and second grooves, the first body portion further comprising a first detent located in the first groove;
a keypad; and
a second body comprising first and second runners, the first and second runners being positioned in the first and second grooves respectively to allow the second body portion to slide longitudinally relative to the first body portion between a closed position in which the keypad is concealed and an open position in which the keypad is exposed;

wherein the second portion further comprising a first recess in the first runner to hold the second body portion relative to the first body portion when the first recess coincides with the first detent, the first recess being positioned in the first runner to coincide with the first detent when the second body portion is in the closed position; and a second recess in the first runner to hold the second body portion relative to the first body portion when the second recess coincides with the first detent, the second recess being positioned in the first runner to coincide with the first detent when the second body portion is in the open position.

20. The portable telephone as claimed in claim 19, wherein the second body portion further comprises a third recess in the first runner to hold the second body portion relative to the first body portion when the third recess coincides with the first detent.

21. The portable telephone as claimed in claim 20, wherein the third recess is positioned in the first runner to coincide with the first detent when the second body portion is in a position intermediate the open and closed positions.

22. The portable telephone as claimed in claim 21, wherein the first body portion further comprises a second detent located in the second groove, and the second body portion further comprises a fourth recess in the second runner to hold the second body portion relative to the first body portion when the fourth recess coincides with the second detent.

23. The portable telephone as claimed is claim 22, wherein the fourth recess is positioned in the second runner to coincide with the second detent when the second body portion is in the closed position.

24. The portable telephone as claimed in claim 22, wherein the fourth recess is positioned in the second runner to coincide with the second detent when the second body portion is in the open position.

25. The portable telephone as claimed in claim 24, wherein the first and second detents are spring loaded.

26. The portable telephone as claimed in claim 24, wherein the first and second detents extend through first and second apertures in the first and second grooves.

27. The portable telephone as claimed in claim 24, wherein the recesses have cammed edges.

* * * * *